(12) United States Patent
Tungare et al.

(10) Patent No.: US 7,463,113 B2
(45) Date of Patent: Dec. 9, 2008

(54) APPARATUS AND METHODS RELATING TO ELECTRICALLY CONDUCTIVE PATH INTERFACES DISPOSED WITHIN CAPACITOR PLATE OPENINGS

(75) Inventors: Aroon Tungare, Winfield, IL (US); Manes Eliacin, Buffalo Grove, IL (US); Lih-Tyng Hwang, Crystal Lake, IL (US); Robert Lempkowski, Elk Grove Village, IL (US); Junhua Liu, Roselle, IL (US); Jovica Savic, Downers Grove, IL (US)

(73) Assignee: Motorla, Inc., Schaumburg, IL (US)

( * ) Notice: Subject to any disclaimer, the term of this patent is extended or adjusted under 35 U.S.C. 154(b) by 349 days.

(21) Appl. No.: 11/276,429

(22) Filed: Feb. 28, 2006

(65) Prior Publication Data
US 2008/0013251 A1   Jan. 17, 2008

(51) Int. Cl.
*H01P 1/10* (2006.01)
(52) U.S. Cl. ...................................... 333/105; 333/24 C
(58) Field of Classification Search ................. 333/105, 333/262, 24 C; 200/181
See application file for complete search history.

(56) References Cited

U.S. PATENT DOCUMENTS

| 5,475,351 | A  | * | 12/1995 | Uematsu et al. ............. 333/261 |
| 6,649,852 | B2 |   | 11/2003 | Chason et al. |
| 6,714,105 | B2 |   | 3/2004  | Eliacin et al. |
| 6,777,629 | B2 |   | 8/2004  | Lane et al. |
| 6,800,820 | B1 |   | 10/2004 | Liu et al. |
| 6,859,119 | B2 |   | 2/2005  | Eliacin et al. |
| 6,917,086 | B2 | * | 7/2005  | Cunningham et al. ........ 257/415 |
| 7,239,222 | B2 | * | 7/2007  | Nagaishi et al. ............. 333/247 |
| 7,312,677 | B2 | * | 12/2007 | Nakatani et al. ............. 335/78 |

\* cited by examiner

*Primary Examiner*—Benny Lee
*Assistant Examiner*—Alan Wong

(57) ABSTRACT

A first and second capacitor plate are provided (101 and 102). Each capacitor plate has an opening disposed therethrough with the second capacitor plate being disposed substantially opposite the first capacitor plate. A first electrically conductive path interface is then disposed (103) in one of these openings as is at least a second electrically conductive path interface (104).

19 Claims, 4 Drawing Sheets

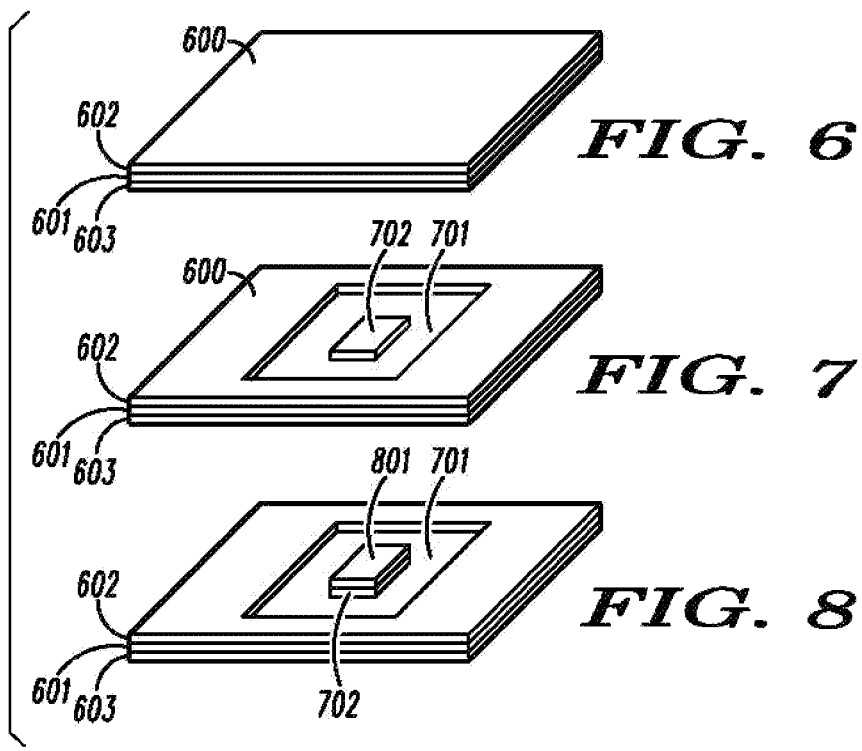
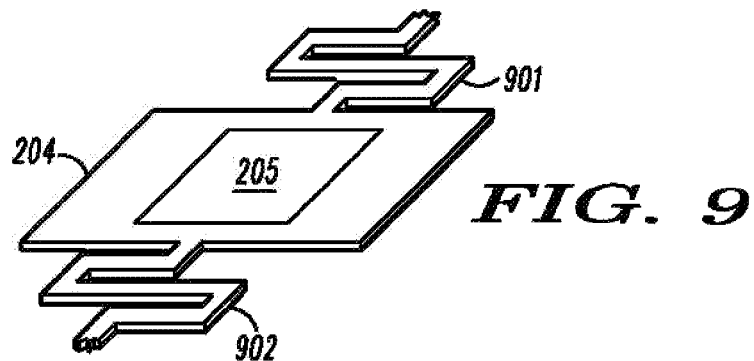
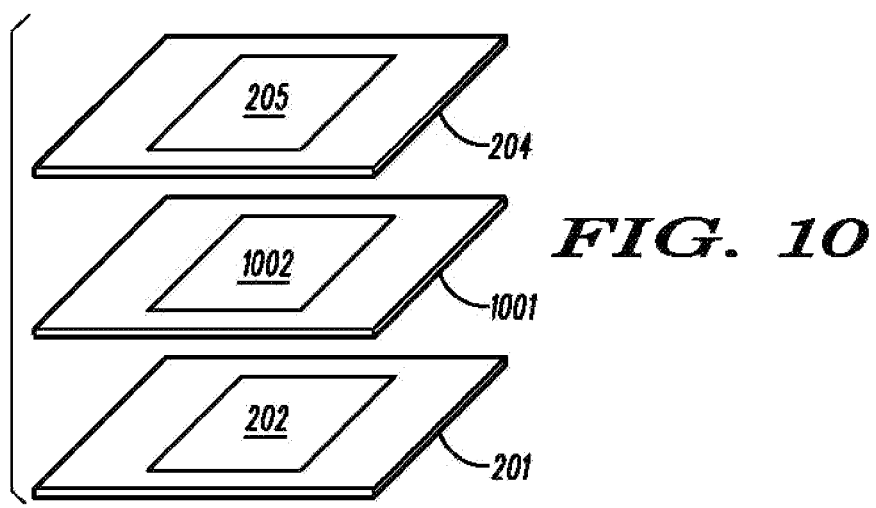

APPARATUS AND METHODS RELATING TO ELECTRICALLY CONDUCTIVE PATH INTERFACES DISPOSED WITHIN CAPACITOR PLATE OPENINGS

TECHNICAL FIELD

This invention relates generally to electrically conductive path interfaces.

BACKGROUND

Electrically conductive path interfaces are known in the art and frequently comprise, for example, part of a corresponding switch. Not all switch designs provide desired levels of performance under all operating circumstances. In some cases problems may exist with respect to operating characteristics of the switch itself (regarding, for example, actuation speed, actuation performance, and so forth). In other cases problems may exist with respect to manufacturing yield, cost of manufacturing, form factor requirements, and so forth.

Microelectromechanical system (MEMS) technology is also known in the art. This art pertains generally to the fabrication and provision of small electro-mechanical components such as switches or the like. It is known, for example, to employ printed wiring board fabrication techniques to fabricate microelectromechanical system components having a footprint of about 1 to 10 millimeters by about 1 to 10 millimeters. Components of this size are sometimes denoted as representing a medium-sized microelectromechanical system element.

Though MEMS techniques offers at least the potential for some relief from at least some of the previously noted problems with switch design, present solutions in this regard nevertheless continue to present these and similar obstacles. For example, a MEMS-based radio frequency switch design can still typically be expected to present sometimes serious issues with respect to poor manufacturing yield, unacceptable electrically actuated performance, and so forth.

BRIEF DESCRIPTION OF THE DRAWINGS

The above needs are at least partially met through provision of the method and appartaus relating to electrically conductive path interfaces disposed within capacitor plate openings described in the following detailed description, particularly when studied in conjunction with the drawings, wherein:

FIG. 6 comprises a perspective view as configured in accordance with various embodiments of the invention;

FIG. 7 comprises a perspective view as configured in accordance with various embodiments of the invention;

FIG. 8 comprises a perspective view as configured in accordance with various embodiments of the invention;

FIG. 9 comprises a perspective schematic view as configured in accordance with various embodiments of the invention;

FIG. 10 comprises an exploded perspective schematic view as configured in accordance with various embodiments of the invention;

Figure 1:
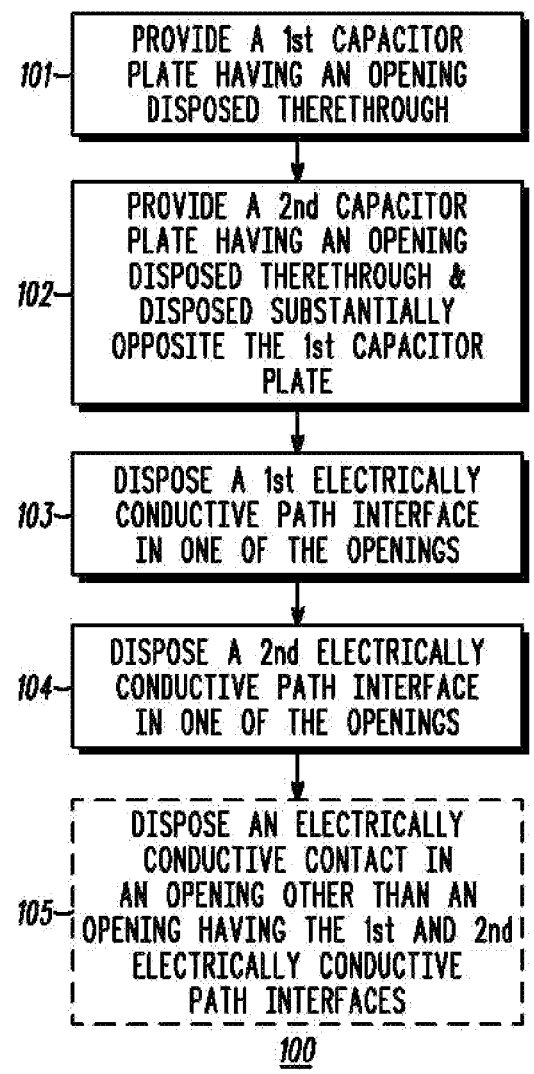
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, a first and second capacitor plate are provided. Each capacitor plate has an opening disposed therethrough with the second capacitor plate being disposed substantially opposite the first capacitor plate. A first electrically conductive path interface is then disposed in one of these openings as is at least a second electrically conductive path interface.

By one approach a single such opening through a capacitor plate may accommodate both the first and second electrically conductive path interface. In such a case, if desired, the opposing opening may accommodate another electrically conductive contact that may, under appropriate operating conditions, serve to conductively bridge the first and second electrically conductive path interfaces. By another approach the opening in the first capacitor plate may contain the first electrically conductive contact while the opening in the second capacitor plate contains the second electrically conductive contact.

By one configuration the first and second capacitor plates may be selectively movable with respect to one another. For example, at least one of the capacitor plates can be suspended using one or more corresponding supports that resiliently hold the capacitor plates apart from one another but that permits a sufficient biasing force (such as an electrostatic force) to cause at least the suspended capacitor plate to move towards the opposing capacitor plate. If desired, a dielectric layer can be disposed between the first and second capacitor plates to substantially prevent electrical contact between these plates when such selective movement towards one another occurs.

So configured, these teachings permit a wide variety of specific manufacturing approaches that are readily employed to good effect. Those skilled in the art will appreciate, for example, that these teachings will readily permit the design and fabrication of a radio frequency switch using MEMS manufacturing techniques. The disclosed structure and corresponding techniques serve, in general, to support higher yield manufacturing expectations while also providing improved electrically actuated performance.

Figure 2:
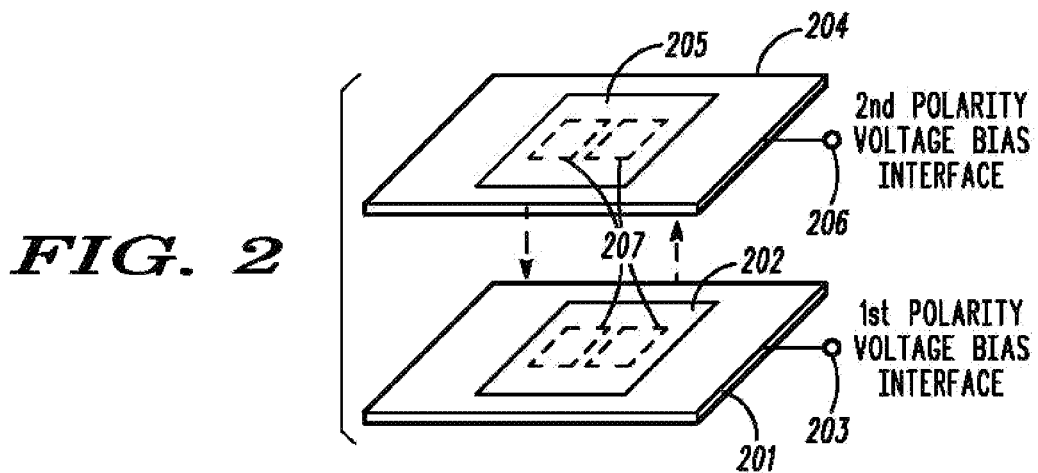
FIG. 2 comprises a perspective schematic view as configured in accordance with various embodiments of the invention.

These and other benefits may become clearer upon making a thorough review and study of the following detailed description. Referring now to the drawings, and in particular to FIG. 1, an illustrative corresponding process 100 provides for provision 101 of a first capacitor plate having an opening disclosed therethrough. With momentary reference to FIG. 2, such a capacitor plate 201 can comprise, for example, a layer of electrically conductive material (such as copper, silver, gold, or the like) and can be formed via any process of choice.

By one approach this capacitor plate 201 can comprise a portion of a conductive layer as has been provided, for example, on an insulating substrate of choice such as a printed wiring board. In particular, the capacitor plate 201 can be formed through selective deposition of a conductive material on this insulating substrate and/or can be formed by selective removal of conductive material from, for example, a layer of such material on the insulating substrate. Such fabrication techniques are well known in the art and require no further elaboration here. This capacitor plate 201 may assume any form factor or shape of choice with FIG. 2 providing a depiction of a generally rectangularly-shaped capacitor plate 201 for purposes of illustration and not to suggest a limitation in this regard.

The opening 202 through the capacitor plate 201 may be similarly formed using, for example, material removal techniques of choice. As with the capacitor plate 201 the opening 202 may also assume essentially any shape of choice as may best comport with the needs and requirements of a specific application setting.

Referring again to FIG. 1, this process 100 also makes for provision 102 of a second capacitor plate having an opening disposed therethrough and that is disposed substantially opposite the first capacitor plate. An illustrative exemplary second capacitor plate 204 having an opening 205 disposed therethrough appears in the aforementioned FIG. 2. By one approach this step 102 provides for provision of a second capacitor plate 204 that is selectively movable with respect to the first capacitor plate 201. There are various ways by which such selective movement may be accommodated with at least one specific example being provided further below.

Those skilled in the art will appreciate that there are various ways by which this second capacitor plate 204 may be so provided. By one approach material deposition and removal techniques as are otherwise employed to form medium-sized MEMS elements (such as the first capacitor plate 201) can be readily used here to provide this second capacitor plate 204 as well.

Figure 5:
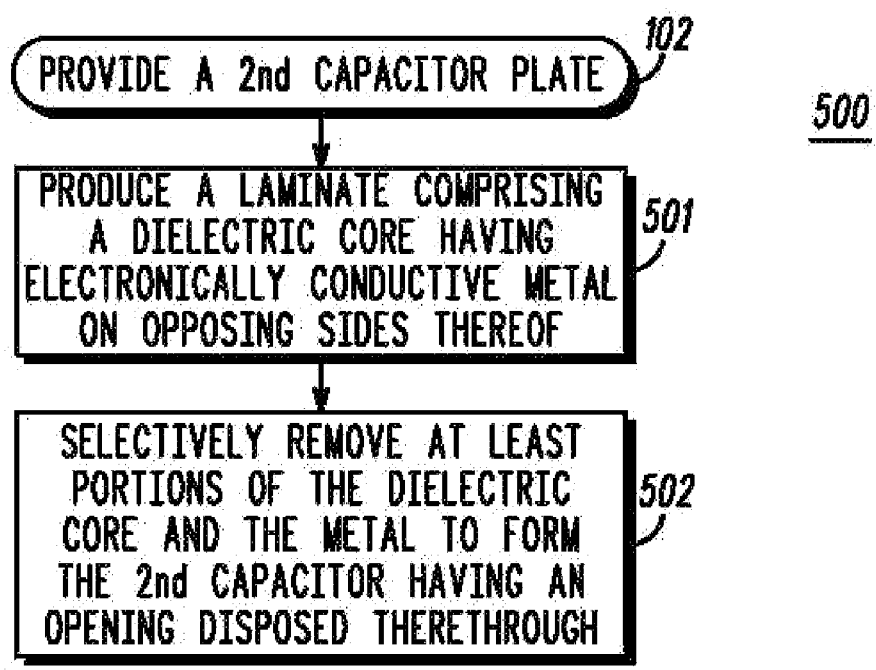
FIG. 5 comprises a flow diagram as configured in accordance with various embodiments of the invention.

By another approach the second capacitor plate 204 can be provided through use of a separate and discrete laminate structure. For example, and referring momentarily to FIG. 5, a corresponding process 500 can effect provision 501 of a laminate comprising a dielectric core having electrically conductive metal on opposing sides thereof. An illustrative example appears in FIG. 6 where such a laminate 600 comprises a substantially planar structure (such as a printed wiring board as is known in the art) having a dielectric material inner layer 601 and having a conductive metal coating 602 and 603 (such as copper) on opposing sides thereof.

Referring again to FIG. 5, this process 500 can then provide for selectively removing 502 at least portions of the dielectric core and the electrically conductive metal to form the above-described opening. To illustrate, and referring now to FIG. 7, an opening 701 has been formed by etching away corresponding portions of the electrically conductive layer 602 using known techniques in this regard. To illustrate further, and referring momentarily to FIG. 9, both electrically conductive material and portions of the dielectric core have been removed to form the depicted second capacitor plate 204 (a more detailed description of this particular embodiment appears further below).

Figure 11:
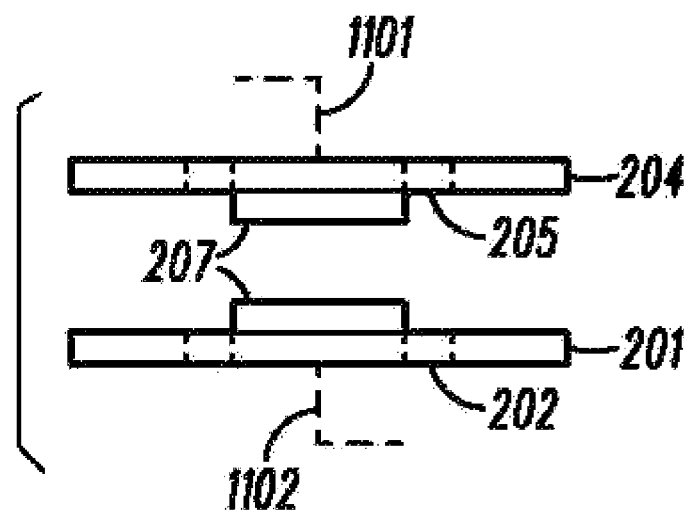
FIG. 11 comprises a side elevational schematic view as configured in accordance with various embodiments of the invention.

Referring again to FIG. 1, the previously described process 100 then provides for disposing 103 a first electrically conductive path interface in one of the previously mentioned openings as are disposed through the first and second capacitor plates and also for disposing 104 a second electrically conductive path interface in one of these openings. As suggested by the illustration provided in FIG. 2, these first and second electrically conductive path interfaces 207 may each be in either of the first and second capacitor plate openings 202 and 205. With reference to FIG. 11 it will be appreciate that, by one approach, the first and second electrically conductive path interfaces 207 may each be disposed in an opposing capacitor plate opening 202 and 205. Or, if desired (and referring now to FIG. 12), both the first and second electrically conductive path interfaces 207 may share a common capacitor plate opening (in this illustrative example, that shared capacitor plate opening comprises the opening 205 as corresponds to the second capacitor plate 204 with those skilled in the art understanding that the opening 202 for the first capacitor plate 201 could also serve in this role as well).

Referring again to FIG. 1, when the first and second electrically conductive path interfaces share a same capacitor plate opening, if desired, this process 100 may optionally further provide for disposing 105 an electrically conductive contact within the opening that is other than the opening that accommodates the first and second electrically conductive path interfaces. To illustrate, and referring again to FIG. 12, such an electrically conductive contact 301 is shown to be disposed within the opening 202 for the first capacitor plate 201. In such an embodiment, if may be useful to position the electrically conductive contact 301 such that it may make contact with both the first and second electrically conductive path interfaces 207 when and as the first and second capacitor plates 201 and 204 are moved towards one another. So configured, the electrically conductive contact 301 can serve as a bridge to permit a first electrically conductive path 1101 to be electrically coupled to a second electrically conductive path 1102.

As disclosed above, these teachings accommodate selective movement of the first and second capacitor plates towards and away from one another. Such selective movement towards one another can be instigated, for example, by applying opposite polarity voltage biases thereto (where "polarity" will be understood to refer, in context, to a positive polarity, a negative polarity, and/or a ground or neutral polarity). To illustrate, and referring again to FIG. 2, the first capacitor plate 201 can comprise a first polarity voltage bias interface 203 and the second capacitor plate 204 can similarly comprise a second polarity voltage bias interface 206 to facilitate the controlled biasing of these capacitor plates 201 and 204 in this manner.

A resilient suspension and support structure can be used if desired to support, for example, the second capacitor plate 204 in a manner that permits its selective movement towards and away from the first capacitor plate 201. With reference to FIG. 9, for example, the second capacitor plate 204 can be attached on opposing sides to serpentine support members 901 and 902 that attach to other structure as may be available in a given design application setting. As another example, if desired, a cantilever structure (not shown) can be employed to support and suspend the second capacitor plate 204 from only one side thereof. Such support structures are known in the art and require no further elaboration here.

Using such resilient support structure(s) can serve, of course, to move the capacitor plates away from each other upon removing the above-mentioned opposing polarity voltage biases therefrom. (Such active and passive biasing techniques are known in the art. Furthermore, these teachings are not particularly sensitive to the selection of any particular practice in this regard. Therefore, for the sake of brevity, further elaboration will not be presented here regarding such matters.)

In many cases it may be unhelpful to permit the first and second capacitor plates to contact one another when urging them towards one another. By one approach, and referring now to FIG. 10, a dielectric layer 1001 can be disposed between the first capacitor layer 201 and the second capacitor layer 204 to substantially prevent such electrical contact. This dielectric layer 1001 can itself have an opening 1002 formed therethrough in substantial registration with the openings 202 and 205 in the capacitor layers 201 and 204 in order to accommodate the electrically conductive path interfaces and/or electrically conductive contacts as may otherwise be provided in the openings 202 and 205 of the capacitor plates 201 and 204.

Figure 3:
FIG. 3 comprises a side elevational schematic view as configured in accordance with various embodiments of the invention.
Figure 4:
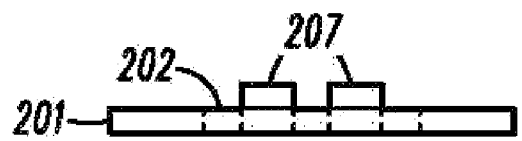
FIG. 4 comprises a side elevational schematic view as configured in accordance with various embodiments of the invention.

As described above, the electrically conductive path interfaces and the electrically conductive contacts are disposed within the capacitor plate openings. In at least some application settings, however, it may be further desired to configure such elements such that they extend outwardly beyond the defining boundaries of these openings. For example, and referring to FIG. 3, an electrically conductive contact 301 can be configured to have a portion thereof that extends outwardly from the opening 202 within which the electrically conductive contact 301 is disposed. Similarly, and referring to FIG. 4, one or both of the electrically conductive path interfaces 207 can be similarly configured to extend beyond the confines of the opening 202 in the capacitor plate 201.

So configured, these elements may be better able to make physical and electrical contact with one another when such contact is selectively sought. To illustrate, and referring again to FIG. 11, a first electrically conductive path interface 207 as extends outwardly of the opening 202 in the first capacitor plate 201 can readily make physical and electrical contact with an opposing electrically conductive path interface 207 as extends outwardly of the opening 205 in the second capacitor plate 204 provided the two capacitor plates 201 and 204 are urged sufficiently close to one another. When this occurs, those skilled in the art will understand that a first electrically conductive path 1101 is then electrically connected to a second electrically conductive path 1102 such that the overall apparatus serves as a switch (such as, for example, a radio frequency switch).

Figure 12:
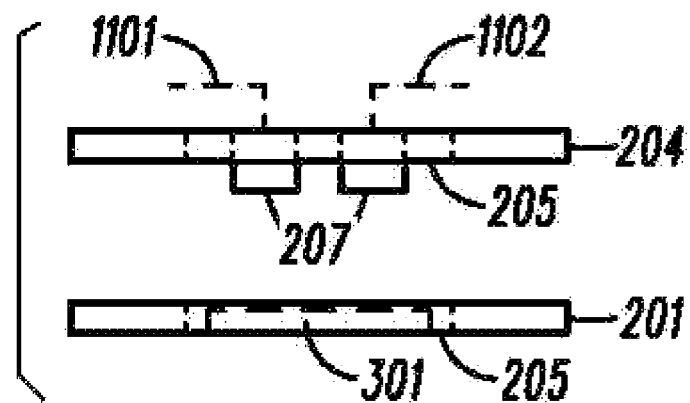
FIG. 12 comprises a side elevational schematic view as configured in accordance with various embodiments of the invention.

As another illustration in this regard, and referring now to FIG. 12, it will be seen that two electrically conductive path interfaces 207 as share a same opening 205 in the second conductor plate 204 and which extend beyond the ambit of that opening 205 are able to each make physical and electrical contact with a corresponding electrically conductive contact 301 that resides within the opening 202 of the first conductor plate 201. In this embodiment, the electrically conductive path interfaces 207 extend outwardly to a sufficient distance such that the electrically conductive contact 301 instead remains fully disposed within the confines of the first conductor opening 202. Notwithstanding this configuration the first and second conductor plates 201 and 204 are able to be brought sufficiently close to one another to permit the electrically conductive path interfaces 207 to make contact with the electrically conductive contact 301 without also necessarily requiring the first conductor plate 201 to contact the second conductor plate 204.

So configured, again, a first electrically conductive path 1101 can be selectively connected to a second electrically conductive path 1102 as desired. (Those skilled in the art will recognize that various means exist by which such electrically conductive paths may be provided and/or connected to the electrically conductive path interfaces. For example, by one approach, conductive vias and/or conductive micro-vias as are known in the art can be readily employed for this purpose.)

Those skilled in the art will recognize that the above-described configurations are illustrative only and do not represent all possible permutations and combinations by which these teachings may be leveraged. For example, with respect to the embodiment shown in FIG. 12, if desired, the electrically conductive contact 301 can also extend outwardly beyond the opening 202. Or, as another example, the electrically conductive contact 301 can extend outwardly of its opening while the two electrically conductive path interfaces 207 remain disposed within their corresponding opening 205, all with similar effect and operability.

Referring again to FIG. 7, when providing the second capacitor plate by use of a laminate structure and process as described above, one or more electrically conductive path interfaces and/or electrically conductive plates 702 can be formed, for example, by leaving corresponding conductive material when removing surrounding material to form the previously described opening 701. If desired, and referring now to FIG. 8, additional conductive material 801 can be subsequently deposited thereon in order to effect provision of a corresponding element that extends outwardly of the surrounding opening 701 for the purposes as have been related above.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. For example, though only two electrically conductive path interfaces have been described in the above examples, those skilled in the art will readily understand and appreciate that three or more such interfaces can be similarly accommodated to create, for example, multiple-throw/multiple-pole switches of varying design and configuration.

We claim:

1. An apparatus comprising:
   a first capacitor plate having an opening disposed therethrough;
   a second capacitor plate having an opening disposed therethrough and being disposed substantially opposite the first capacitor plate;
   a first and a second electrically conductive path interface wherein each of the first and second radio frequency signal interface is disposed within at least one of the opening disposed through the first capacitor plate and the opening disposed through the second capacitor plate.

2. The apparatus of claim 1 wherein the apparatus comprises a radio frequency switch.

3. The apparatus of claim 1 wherein the second capacitor plate has a first polarity voltage bias interface and the first capacitor plate has a second polarity voltage bias different from the first polarity voltage bias.

4. The apparatus of claim 1 wherein the first capacitor plate and the second capacitor plate are selectively movable towards and away from one another such that when the first and second capacitor plate are moved towards one another the first and second electrically conductive path interfaces are brought into electrical contact with one another.

5. The apparatus of claim 4 further comprising a dielectric layer disposed between the first capacitor plate and the second capacitor plate such that the dielectric layer substantially prevents electrical contact as between the first capacitor plate and the second capacitor plate as the first capacitor plate and the second capacitor plate are selectively moved towards one another.

6. The apparatus of claim 4 wherein the first capacitor plate is suspended from a support with respect to the second capacitor plate.

7. The apparatus of claim 4 wherein the first capacitor plate is suspended from at least two supports with respect to the second capacitor plate.

8. The apparatus of claim 1 wherein each of the first and second electrically conductive path interfaces is fixed in position with respect to a corresponding one of the first and second capacitor plates such that movement of the corresponding capacitor plate causes movement of a corresponding electrically conductive path interface.

9. The apparatus of claim 8 wherein at least one of the first and second electrically conductive path interfaces extends beyond its corresponding capacitor plate towards an opposing capacitor plate.

10. The apparatus of claim 1 wherein both of the first and second electrically conductive path interfaces are disposed within the opening that is disposed through the first capacitor plate and wherein an electrically conductive contact is disposed within the opening that is disposed through the second capacitor plate.

11. The apparatus of claim 1 wherein the first electrically conductive path interface is disposed within the opening that is disposed through the first capacitor plate and the second electrically conductive path interface is disposed within the opening that is disposed through the second capacitor plate.

12. A method comprising:
providing a first capacitor plate having an opening disposed therethrough;
providing a second capacitor plate having an opening disposed therethrough and that is disposed substantially opposite the first capacitor plate;
disposing a first electrically conductive path interface in one of the openings as are disposed through the first and second capacitor plates;
disposing a second electrically conductive path interface in one of the openings as are disposed through the first and second capacitor plates.

13. The method of claim 12 wherein providing the second capacitor plate comprises providing the second capacitor plate that is selectively movable with respect to the first capacitor plate.

14. The method of claim 12 wherein disposing the first electrically conductive path interface and disposing the second electrically conductive path interface comprises disposing both the first and second electrically conductive path interfaces in the same opening of a given one of the first and second capacitor plates.

15. The method of claim 14 further comprising:
disposing an electrically conductive contact within the opening that is disposed through one of the first and second capacitor plates other than the given one of the first and second capacitor plates.

16. The method of claim 12 wherein disposing a first electrically conductive path interface in one of the openings as are disposed through the first and second capacitor plates comprises disposing the first electrically conductive path interface in the opening as is disposed through the first capacitor plate and disposing a second electrically conductive path interface in one of the openings as are disposed through the first and second capacitor plates comprises disposing the second electrically conductive path interface in the opening as is disposed through the second capacitor plate.

17. The method of claim 12 wherein providing a second capacitor plate having an opening disposed therethrough and that is disposed substantially opposite the first capacitor plate further comprises:
providing a laminate comprised of a dielectric core having electrically conductive metal on opposing sides thereof;
selectively removing at least portions of the dielectric core and the electrically conductive metal to form the second capacitor plate having an opening disposed therethrough;
integrally combining the second capacitor plate with a structure that comprises the first capacitor plate.

18. The method of claim 17 wherein selectively removing at least portions of the dielectric core and the electrically conductive metal to form the second capacitor plate having a hole disposed therethrough further comprises selectively removing at least portions of the dielectric core and the electrically conductive metal to form at least one of:
the first electrically conductive path interface;
the second electrically conductive path interface;
an electrically conductive contact that is electrically isolated from the second capacitor plate.

19. A method comprising:
providing a first structure comprising, at least in part, a portion of an electrical component;
providing a laminate comprised of a dielectric core having electrically conductive metal on opposing sides thereof;
selectively removing at least portions of the dielectric core and the electrically conductive metal to form a remaining portion of the electrical component;
integrally combining the remaining portion of the electrical component with the first structure;
providing the first structure comprises providing a first capacitor plate having an opening disposed therethrough;
selectively removing at least portions of the dielectric core and the electrically conductive metal to form a remaining portion of the electrical component further comprises providing a second capacitor plate having an opening disposed therethrough; and
integrally combining the remaining portion of the electrical component with the first structure further comprises disposing the first capacitor plate substantially opposite the second capacitor plate;
and further comprising:
disposing a first electrically conductive path interface in one of the openings as are disposed through the first and second capacitor plates;
disposing a second electrically conductive path interface in one of the openings as are disposed through the first and second capacitor plates.

* * * * *